United States Patent Office 3,469,296
Patented Sept. 30, 1969

3,469,296
TOOLHOLDERS FOR USE WITH DETACHABLE INSERTS
Leonard Reeve, Leicester, Stanley Clifford Brown, Coventry, and Harold Beckett, Berkswell, England, assignors to Wickman Wimet Limited
Filed June 21, 1965, Ser. No. 465,272
Claims priority, application Great Britain, June 30, 1964, 26,907/64
Int. Cl. B26d 1/00
U.S. Cl. 29—96
2 Claims

ABSTRACT OF THE DISCLOSURE

The improved toolholder including a shank having a surface for accommodating a detachable cutting insert and which insert has an aperture therethrough for accommodating one end of a clamping bar, the shank having a bore accommodating such bar and the bar having an arcuate surface portion fitting rather flush within the bore so that clamping or setting means can be urged against another surface portion of the bar to cause the same to pivot within the bore and clamp the insert in position.

---

This invention relates to toolholders of the kind used for clamping in position a detachable cutting insert having a hole extending therethrough.

According to the invention, a toolholder of the kind specified comprises a shank defining a seating for the insert, a bore extending into the shank from said seating, a clamping bar in said bore, the clamping bar having one end extending from the bore for engagement in the hole in the insert, and being pivotable to cause the insert to be clamped against one or more surfaces fixed relative to the shank, and means for pivoting the clamping bar.

Figure 1:
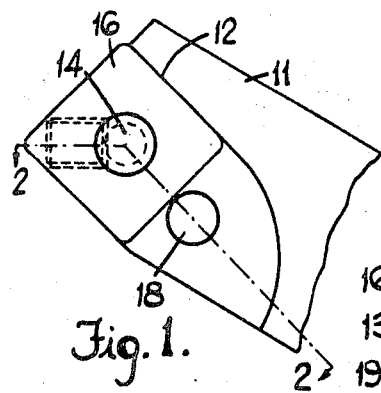
Figure 2:
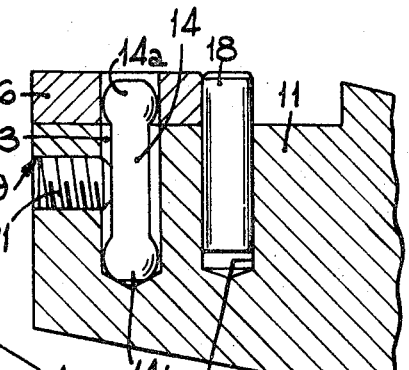
Figure 3:
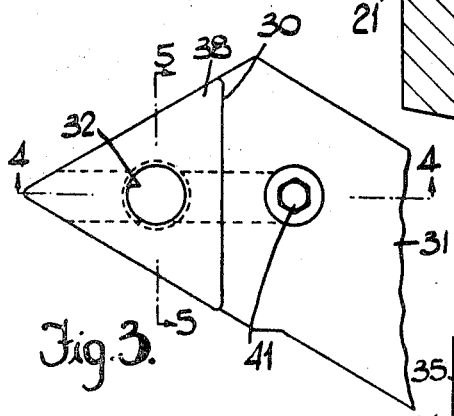

In the accompanying drawings FIGURE 1 is a plan view of one example of a toolholder according to the invention, FIGURE 2 is a sectional view on the line 2—2 in FIGURE 1. FIGURE 3 is a plan view of a second example, and FIGURES 4 and 5 respectively are sectional views on the lines 4—4, 5—5 in FIGURE 3.

Referring to FIGURES 1 and 2 there is provided a shank 11 which at one end is recessed to provide a seating bounded in part by a wall 12 having a straight portion and an arcuate portion subtending an angle of 90°. Extending downwardly into the shank 11 from the seating is a bore 13 in which is engaged a clamping bar 14 of smaller cross-section than the bore 13 apart from its ends 14a, 14b, which are of bulbous or spherical form. The end 14a extends from the bore 13 for engagement with a hole in a detachable cutting insert 16, and the end 14b effectively forms a ball and socket joint with the closed end of the bore 13, so that the clamping bar 14 is a pivotable in the bore 13.

A second bore 17, parallel to the bore 13, also extends into the shank 11 from the seating, and located within and extending from the bore 17 is a post 18. Moreover the shank 11 is formed with a bore 19 at right angles to and intersecting the bore 13. In the bore 19 is a screw 21, the head of which is below the surface of the shank, but is accessible for adjusting the screw 21. The screw acts on the clamping bar 14 and the arrangement is such that when the bar 14 is engaged with an insert 16 and the screw 21 is tightened, the bar 14 will pivot about its end 14b and clamp one pair of adjacent faces of the insert 16 against the wall 12 and the post 18 respectively. The insert 16 can be released by slackening the screw 21, and provided the screw is not slackened too much it will still protrude into the bore 13 and thereby prevent accidental loss of the bar 14.

Figure 4:
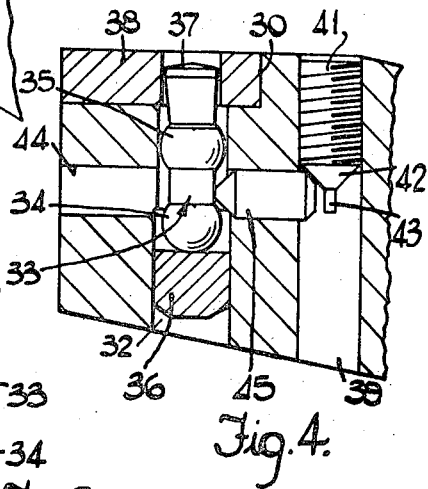
Figure 5:
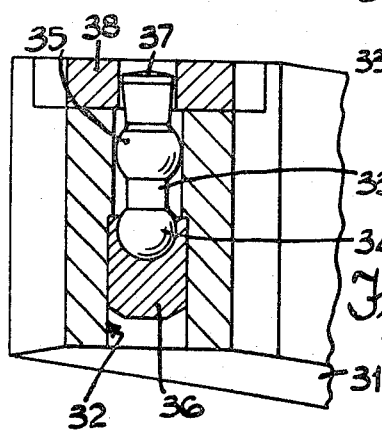

Referring now to FIGURES 3, 4 and 5, there is provided a shank 31 recessed at one end to define a triangular seating one side of which is bounded by a wall 30. Extending from the seating through the shank 31 is a bore 32 in which is engaged a clamping bar 33. The bar 33 is generally of smaller diameter than the bore 32 but is formed at one end, and midway between its ends, with bulbous or spherical portions 34, 35 respectively. The portion 34 is engaged in a groove of complementary cross-section formed in a plug 36 closing the end of the bore 32 remote from the seating. The portion 35 is engaged with the bore 32 and in use constitutes a pivot for the bar 33. The end 37 of the bar 33 extends from the bore 32 for engagement with a hole formed in a detachable cutting insert 38 of triangular form.

Extending through the shank 31 at a position spaced from the seating is a screw-threaded bore 39 which extends parallel to the bore 32, and has engaged therein a screw 41. The end of the screw is formed with a frusto-conical portion 42 terminating in an axial projection 43. The shank 31 is formed with a third bore 44 extending at right angles to and communicating with the bores 32, 39 and slidably located within the bore 44 is a plunger 45 formed with frusto-conical ends, extending into the bores 32, 39 respectively. One end of the plunger 45 engages the frusto-conical portion 42 of the screw 41, while the other end of the plunger engages the bar 33 between the portions 34, 35 thereof. The arrangement is such that movement of the screw 41 into the bore 39 causes the plunger 45 to move axially and thereby pivot the bar 33 about the portion 35, so clamping the insert 38 against the wall 30. Moreover, since the bar 33 pivots about a central portion 35, its pivoting movement also tends to clamp the insert onto the seating. It will be appreciated that in this example the bar 33 can only move in a plane parallel to the groove in which the portion 34 is engaged. The projection 43 on the screw 41 prevents the plunger 45 from extending too far into bore 39 when the screw 41 is retracted by a substantial amount.

The bore 39 could be disposed at any convenient angle in the shank and need not be parallel with bore 32. Moreover, the screw 41 can extend into the bore 39 from either end.

The two examples shown can of course be modified to accept inserts of shapes other than those shown and the inserts can be arranged to have the required rakes as is well known in the art. Moreover, an anvil can be interposed between the insert and shank.

The clamping bars 14, 33 can be pivoted in a variety of ways other than those shown. For example, a bar could be formed with a surface engaged by a cam angular movement of which pivots the bar, or the bar 14 shown in FIGURE 1 could me pivoted by a screw extending at right angles to the screw 21 and having a tapered end engaging the bar tangentially.

Having thus described our invention what we claim as new and desire to secure by Letters Patent is:

1. In a toolholder for receiving a detachable cutting insert and which toolholder is of the type including a shank having a seating and at least one wall against which said insert is to be clamped and said insert having an aperture therethrough for accommodating a clamping bar, said shank being provided with a first bore adapted for alignment with the aperture in said insert when the latter is in clamped relation, a clamping bar in the first bore, said clamping bar having opposite ends with one end engageable in the aperture in the insert and the other end being located entirely within the limits of the bore, said other end having a spherical portion engaged in a socket within the bore, a second spherical portion on the bar spaced axially from the first spherical portion in the direction of said one end and engaging the wall of the bore for constituting a pivot for the bar, the portion of the bar between said spherical portions being of lesser cross-sectional area than the bore, said shank having a second bore extending at right angles to and in communication with the first bore between said first and second spherical portions, said shank being provided with a further bore in communication with said second bore, a plunger slidably mounted in said second bore having end portions extending into said first and further bores, and threaded means within said further bore having means cooperable with the end portion of the plunger extending into said further bore to slide the plunger axially to pivot the bar about the second spherical portion to clamp the insert against the wall as well as clamp the insert onto its seating upon manipulation of the threaded means.

2. The toolholder as claimed in claim 1 in which the end of the plunger communicating with the further bore and an end of the threaded means each being frusto-conical, and an axially extending projection on the end of the threaded means preventing the plunger from extending too far into the further bore when the end of the threaded means is moved a substantial distance away from the end of the plunger.

References Cited
UNITED STATES PATENTS

| | | | |
|---|---|---|---|
| 3,137,059 | 6/1964 | Hertel | 29—96 |
| 3,238,600 | 3/1966 | Milewski | 29—96 |
| 3,289,272 | 12/1966 | Stier | 29—96 |

HARRISON L. HINSON, Primary Examiner